United States Patent Office 3,574,115

Patented Apr. 6, 1971

3,574,115

MAGNETIC COMPOSITIONS OF CERIUM MODIFIED CHROMIUM OXIDE AND METHODS OF MANUFACTURE

Robert S. Haines, Boulder, Colo., assignor to International Business Machines Corporation, Armonk, N.Y.

No Drawing. Filed June 30, 1969, Ser. No. 837,870

Int. Cl. C04b *35/12*

U.S. Cl. 252—62.51 8 Claims

ABSTRACT OF THE DISCLOSURE

Cerium modified ferro-magnetic chromium oxide compositions containing 56% to 61.8% chromium and 0.1% to 6% cerium, both combined with oxygen, in the form of finely divided particles. These particles are of tetragonal crystalline structure and have a length-to-width ratio of as much as 22 to 1 and an actual length in the range of about 0.5 to 13 microns. The process of forming cerium modified chromium oxide ferro-magnetic compositions consists of mixing a chromium compound with a source of cerium, and then subjecting the mixture to heat and pressure.

BACKGROUND OF THE INVENTION

Field of the invention

This invention relates to magnetic compositions and to novel methods for preparing them. More particularly, it relates to ferro-magnetic compositions of cerium modified chromium oxide having tetragonal crystal structure, and to methods for their preparation in finely divided particle form. Such particles are suitable for use, for example, in magnetic recording media, magnetic cores, and the like.

Description of the prior art

In the prior art, various types of magnetic compositions have been prepared in numerous ways. Included in the prior art magnetic compositions are chromium oxides having ferro-magnetic properties. These magnetic chromium oxides have been nominally designated as chromium dioxide and have long been reported in the chemical literature. Early methods of preparation of ferro-magnetic chromium oxide have been by heating chromium tri-oxide in oxygen and by pyrolysis of gaseous chromyl chloride. More recently, methods of producing ferro-magnetic chromium oxide, primarily from chromium tri-oxide under conditions of both heat and pressure and in the presence of water, have been reported. Within the last two decades, heightened interest and activity in the preparation of ferro-magnetic chromium oxide has resulted in a substantial number of publications being made and patents being issued. In some instances, the utilization of preferential substrates during the formation of chromium dioxides by gas pyrolysis has been reported. In other instances, one or more specific modifying ingredients or oxidizing agents have been included in reaction mixtures of chromium compounds during heat and pressure treatment to yield a ferro-magnetic chromium oxide which may or may not be modified with an additive ingredient. In yet another form of activity, multi-step processes of treating various chromium compounds with or without modifying ingredients or oxidizing agents, have been utilized to produce forms of ferro-magnetic chromium oxide.

It is both useful and desirable to provide alternative methods of preparing magnetic chromium oxides and new magnetic chromium oxide compositions, for use, for example, in the manufacture of magnetic recording media.

SUMMARY OF THE INVENTION

It is an object of the present invention to provide cerium modified ferro-magnetic chromium oxide compositions and the processes for their preparation.

A further object is to provide novel chromium oxide materials, including cerium as a component.

It is another object of the present invention to provide ferro-magnetic cerium modified chromium oxide compositions which are useful in the manufacture of magnetic recording media.

Other objects will appear hereinafter.

The present invention provides new types of cerium modified chromium oxide compositions by intimately mixing a source of cerium with a chromium compound, such as chromium tri-oxide, and then heating the mixture at a temperature between about 250° C. and 500° C. while subjecting the reaction mixture to superatmospheric pressure. The cerium source may be equivalent to about 0.1 to about 40°, by weight, of the chromium compound. Pressures ranging from about 10 to 3000 atmospheres are operable. Pressures of about 50 to 1000 atmospheres are preferred.

The source of cerium may be the free metal or any compound containing cerium, although due to its easy availability cerium di-oxide is preferred. Intimate mixing of the chromium compound and the cerium compound may be obtained, if desired, prior to processing in any suitable manner, such as by grinding the constituent ingredients together, or by dissolving them in a suitable solvent, such as water or a mineral acid. After mixing is completed, the combined reaction mixture of cerium and chromium is placed in a vessel in which it is both heated and subjected to superatmospheric pressure.

Cerium modified magnetic chromium oxide produced by the process of this invention, contains about 56% to 61.8% chromium and about 0.1% to 6% cerium, both combined with oxygen, and in the form of finely divided particles. The particles display a rutile (tetragonal) crystalline structure, and are acicular, having a length-to-width ratio of as much as 22 to 1 and an actual length in the range of about 0.5 to 13 microns.

The foregoing and other objects, features, and advantages of the invention will be apparent from the following more particular description of the preferred embodiments of the invention.

DESCRIPTION OF THE PREFERRED EMBODIMENTS

In the following examples, the reactants were reagent grade chemicals; however, use of commercial grade chemicals is within the scope of this invention. Ferro-magnetic particles produced by the method of the present invention were normally separated from the small amounts of unreacted non-magnetic constituents by washing, and then dried. Reaction efficiency was generally in the range of 90%. Powder samples of the magnetic compositions produced by the present invention were measured with a vibrating sample magnetometer, VSM, at 4000 oersteds to determine their magnetic properties. Determination of the chemical content of the magnetic particles was obtained by both X-ray fluorescence spectroscopy and neutron activation. Crystal structure was determined by examination of X-ray diffraction patterns. Particle shape, size, and length-to-width ratios were determined from electron micrographs of the particles. All composition percentages given in the examples are in weight percent.

EXAMPLE I

Cerium oxide, $CeO_2$, (1.7 g.) was dissolved in concentrated nitric acid, $HNO_3$. To this solution was added 19 g. of chromium tri-oxide, $CrO_3$. Gentle heating resulted in total dissolution of all solids. This solution was then evaporated to dryness in an open container under atmospheric conditions and the resulting crystalline cake ground in a mortar with a pestle. When tested with both a magnet and the VSM, at this time, the ground powder was found to be non-magnetic.

This powdered mixture was then placed in a platinum crucible, and the crucible placed in an autoclave. The vessel was then filled with liquid nitrogen, closed, and heated for 2 hours. During the heating cycle, the final pressure of the vessel was brought up to 700 pounds per square inch (48 atm.) at a temperature of 400° C., with this pressure and temperature being maintained for one-half hour. At the end of the heating cycle the vessel was rapidly cooled with shaved ice. The black particles formed within the crucible were then washed throughly, first with water and then with acetone, and dried.

A portion of the resulting particles were packed in a glass cylinder for measurement of magnetic properties by the VSM. The saturation magnetization per gram, or sigma value, was 66 emu./g. at 4000 oersteds, and the intrinsic coercive force of the material was 109 oersteds.

A second preparation of cerium and modified chromium oxide was carried out using the same starting materials in precisely the same manner as above. In the preparation of these particles, the temperature was raised to 430° C. for one-half hour, while the pressure within the container was raised to 12,000 p.s.i. (817 atm.). The resulting particles exhibited a sigma value of 58 emu./g. and a coercivity of 83 oersteds.

EXAMPLE II

To 150 ml. of water was added 15 g. $CrO_3$ which dissolved completely without heating. To this solution was added 1.5 g. $CeO_2$ with little apparent dissolution. The mixture was gently boiled to dryness. The resulting mixture was not found to exhibit any magnetic characteristics. This dry reaction mixture was then placed in an autoclave at 2000 p.s.i. (136 atm.) and heated for one hour to a temperature of 250° C. and for a second hour to a temperature of 420° C., which brought the pressure up to 5400 p.s.i. (368 atm.). The resultant black, ferro-magnetic powder had a sigma value of 53 emu./g. and a coercivity of 132 oersteds. Electron micrographs of the powder indicated that it consisted of acicular particles.

EXAMPLE III

A rutile cerium modified chromium oxide was prepared by placing 5 q. of $CeO_2$ and 15 g. of $CrO_3$ in a beaker containing 200 ml. of water. This mixture was gently heated with stirring, allowing the water to evaporate so that a non-magnetic viscous paste was formed in the bottom of the beaker. This paste was then placed in a Pyrex glass tube having a ground glass joint at its open end, and the tube loosely closed with a ground glass stopper. The tube was then placed in a pressure vessel, and the vessel pressurized at ambient temperature to 1000 p.s.i. (68 atm.) with air. This pressurized vessel containing the $CeO_2$-$CrO_3$ mixture in a tube was then heated to 250° C. for 1 hour, after which the temperature was further raised to 410° C. for an additional hour. The final pressure attained in the vessel, at 410° C. was 3200 p.s.i. (218 atm.), which pressure was, of course, equal to the pressure within the Pyrex tube due to equilibrium conditions.

After heating was completed, the vessel was cooled to room temperature, the pressure released, the vessel opened, and the finely divided black powder formed within the tube removed and washed twice with water, followed by a final washing with methyl alcohol. The clean powder was then dried at 40° C. and tested for magnetic properties. It was determined on the VSM that the particles were ferro-magnetic and had an intrinsic coercivity of 153 oersteds, and a sigma value of 82 emu./g. Analysis of the ferro-magnetic material by X-ray fluorescence spectroscopy showed that it contained about 3% cerium and about 59% chromium. An X-ray diffraction analysis made of this material indicated that it contained tetragonal chromium-dioxide-type crystals modified with cerium oxide as an integral part of the crystal structure. It was determined by electron micrograph that the particles were acicular, having lengths of from 1 to 3 microns, and a length-to-width ratio of from about 3 to 1 to about 23 to 1. Analysis indicated the the reaction was about 90% efficient.

EXAMPLE IV 1 g. of $CeO_2$ and 10 g. of $CrO_3$ were placed in a beaker containing 200 ml. of water and heated with stirring and water evaporation until a non-magnetic paste was formed in the bottom of the beaker. This paste was then placed in a Pyrex tube with a ground glass joint, as in Example III, the tube loosely closed with a ground glass stopper and placed in a pressure vessel. The vessel was then pressurized with air to 900 p.s.i. (61 atm.), heated to 250° C. for 1 hour and then heated for an additional hour at 421° C. The pressure in the vessel at 421° C. was 4100 p.s.i. (278 atm.).

After heating was completed, the vessel was cooled to room temperature with water, the pressure released, the vessel opened, and the finely divided black powder formed within the tube removed and washed twice with water followed by a methyl alcohol rinse. The powder was dried at 40° C. and then measured for magnetic properties. Intrinsic coercivity of the ferro-magnetic powder, as indicated by the VSM was 208 oersteds, while the sigma value was determined to be 68 emu/g. Analysis of the ferro-magnetic material by X-ray fluorescence spectroscopy indicated that it contained about 4% cerium, by weight, and about 58% chromium, by weight. An X-ray diffraction analysis of the powder indicated that it consisted of tetragonal crystals of chromium dioxide modified with a small amount of cerium dioxide. Electron micrographs of these particles showed them to be acicular, having a length-to-width ratio on the order of 4 to 1 to 22 to 1, the particle lengths varying from about 0.5 to 3 microns.

EXAMPLE V 0.4 g. of $CeO_2$ and 10 g. of $CrO_3$ were combined with 200 ml. of water in a beaker and heated with stirring and water evaporation until a thick non-magnetic paste was formed in the bottom of the beaker. This paste was then placed in a Pyrex tube with a ground glass joint, the tube loosely closed with a ground glass stopper and placed in a pressure vessel. The vessel was pressurized with air to 1100 p.s.i. (75 atm.), heated to 250° C. for 1 hour and then raised to 435° C. for an additional hour. Pressure at 435° C. was measured to be 3700 p.s.i. (252 atm.). After heating was completed the vessel was cooled to room temperature with water, the pressure released, the vessel opened and the black powder contained in the tube washed twice with water and once with methyl alcohol.

After drying at 40° C., the intrinsic coercivity of the ferro-magnetic powder was determined by the VSM to be 208 oersteds and the sigma value 74 emu/g. Analysis of the powder, by X-ray fluorescence spectroscopy, indicated that it contained approximately 1.5% cerium and about 58.5% chromium. An X-ray diffraction analysis of the powder showed it to consist of tetragonal chromium dioxide including a small amount of modifying cerium dioxide. Electron micrographs of the particles showed them to be acicular, having lengths of 0.5 to 2.5 microns, and a length-to-width ratio of from 5 to 1 to 20 to 1.

EXAMPLE VI 0.12 g. of $CeO_2$ and 10 g. of $CrO_3$ were mixed with 200 ml. of water in a beaker, and heated, with stirring, until a viscous non-magnetic paste was formed in the bottom of the beaker. This paste was then placed in a Pyrex tube with a ground glass joint, the tube loosely closed and placed in a pressure vessel. The vessel was pressurized with air to 1000 p.s.i. (68 atm.), and then heated for 1 hour at 254° C. and for a second hour at 425° C. The final pressure exhibited within the vessel was 4000 p.s.i. (272 atm.). After heating was completed, the vessel was cooled to room temperature with water, the pressure released, the vessel opened, and the Pyrex tube containing a black powder removed therefrom. The powder was removed from the tube, washed twice with water, and once with methyl alcohol, and then dried at 40° C.

The dried powder exhibited an intrinsic coercivity of 95 oersteds and a sigma value of 92 emu/g., as measured on the VSM. Analysis of the powder by X-ray fluorescence spectroscopy indicated that it contained approximately 0.7% cerium and about 60.5% chromium. An X-ray diffraction analysis of the ferromagnetic powder showed it to consist of tetragonal chromium dioxide with a small amount of modifying cerium dioxide. Electron micrographs of the powder showed it to be acicular, about 4 to 12 microns in length, and having a length-to-width ratio of from 2 to 1 to 18 to 1.

Any chromium compound may be used in the process of the present invention, and the hexavalent compounds, including the tri-oxide, the halides, and the oxychloride are representative examples of compounds which are readily available and which have been used with good results.

For reasons of economy and availability, cerium oxide is the preferred source of cerium. However, other salts, oxides, or cerium, in the elemental form, may be used and still be within the scope of the present invention.

While water and the mineral acids are convenient solvents for the initial step of mixing the chromium and cerium components of this process, other solvents can be used for the same purpose. Similarly, dry grinding by simple mortar and pestle, or by ball milling may be restored to in order to obtain the desired combination of reactants. The reaction process may be carried out using either completely dry ingredients or in the presence of a reaction medium, such as water. Additionally, the use of other modifying or oxidizing ingredients, in addition to cerium, are within the scope of this invention.

Uses for the materials produced in the foregoing examples are well known. For example, the ferromagnetic compositions produced by the examples may be mixed with non-magnetic, organic, film-forming binders and utilized to prepare magnetic recording media.

Typical, but not limiting, binders for use singularly, or in combination, for preparing various recording media including ferromagnetic particles produced in accordance with this invention are polyesters, cellulose esters and ethers, epoxies, vinyl chloride, vinyl acetate, acrylate and styrene polymers and copolymers, polyurethanes, polyamides, aromatic polycarbonate, and polyphenyl ethers.

A wide variety of solvents may be used for forming a dispersion of the fine ferro-magnetic particles produced in the foregoing examples and various binders. Organic solvents, such as ethyl, butyl, and amyl acetate, isopropyl, alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing, or by other known methods.

In preparing recording media, the magnetic particles usually comprise about 40–90% by weight of the solids in the film layer applied to the substrate. The substrate is usually a flexible resin, such as polyester or cellulose acetate material, although other flexible materials as well as rigid base materials are more suitable for some uses. The specific choice of non-magnetic substrate binder, solvent, or method of application of the magnetic composition to the support will vary with the properties desired and the specific form of magnetic recording media being produced.

In preparing magnetic cores and permanent magnets, the products of the examples are mixed with non-magnetic plastic or filler in an amount of about 33–50%, by volume, of the magnetic material; the particles aligned in a magnetic field; and the mixture pressed into a firm magnet structure. Alignment of the particles may be accomplished in an externally applied DC magnetic field of about 4000 gauss, or more. Pressures may vary widely in forming the magnet. Pressures up to 100,000 p.s.i. and fields of 28,000 gauss have been used commercially.

While the invention has been particularly shown and described with reference to preferred embodiments thereof, it will be understood by those skilled in the art that various changes in form and details may be made therein without departing from the spirit and scope of the invention.

What is claimed is:

1. A process for producing a ferro-magnetic cerium modified chromium oxide composition of tetragonal crystal structure containing about 56% to 61.8%, by weight, of chromium and about 0.1% to 6%, by weight, of cerium, each combined with oxygen as an integral part of the crystal structure, which comprises:

heating a mixture of chromium tri-oxide and cerium dioxide at a temperature within the range of about 250° C. to 500° C. and under a pressure greater than 10 atmospheres.

2. The process of claim 1 in which the amount of cerium dioxide in said reaction mixture is from about 0.1% to about 40%, based on the weight of chromium trioxide.

3. The process of claim 2 in which the mixture is under a pressure within the range of about 10 to 3000 atmospheres.

4. The process of claim 3 in which the mixture is heated at a temperature within the range of about 350° C. to 450° C.

5. The process of claim 4 in which the mixture is under a pressure within the range of about 50 to 1000 atmospheres.

6. An acicular cerium modified chromium oxide ferromagnetic composition of tetragonal crystal structure consisting essentially of 56% to 61.8%, by weight, of chromium combined with oxygen and 0.1% to 6%, by weight, of cerium combined with oxygen.

7. The cerium modified chromium oxide ferro-magnetic composition of claim 6 consisting essentially of about 58% to 61.5%, by weight, of chromium and about 0.7% to 4%, by weight of cerium.

8. The cerium modified chromium oxide ferro-magnetic composition of claim 6 in which said ferro-magnetic composition has an intrinsic coercivity within the range of about 80 to 210 oersteds and a sigma value within the range of about 50 to 95 emu/g.

References Cited

UNITED STATES PATENTS

| | | | |
|---|---|---|---|
| 2,956,955 | 10/1960 | Aurthur | 252—62.51 |
| 3,034,988 | 5/1962 | Ingraham et al. | 252—62.51 |
| 3,371,043 | 2/1968 | Hurd et al. | 252—62.51 |

TOBIAS E. LEVOW, Primary Examiner

J. COOPER, Assistant Examiner

U.S. Cl. X.R.

23—145; 117—235